United States Patent
Varshovi

(10) Patent No.: US 6,852,142 B2
(45) Date of Patent: Feb. 8, 2005

(54) ORGANIC-BASED FERTILIZER

(75) Inventor: Amir Varshovi, Gainesville, FL (US)

(73) Assignee: Green Technologies, Inc., Gainesville, FL (US)

( * ) Notice: Subject to any disclaimer, the term of this patent is extended or adjusted under 35 U.S.C. 154(b) by 225 days.

(21) Appl. No.: 09/872,150

(22) Filed: Jun. 1, 2001

(65) Prior Publication Data

US 2002/0053229 A1 May 9, 2002

Related U.S. Application Data

(60) Provisional application No. 60/208,422, filed on Jun. 1, 2000.

(51) Int. Cl.⁷ .............................. C05F 9/00; C05F 1/00; C05C 9/00; C05B 7/00

(52) U.S. Cl. ..................... 71/14; 71/11; 71/15; 71/20; 71/29; 71/31; 71/34; 71/35; 71/36

(58) Field of Search ................................ 71/11, 14, 15, 71/20, 29, 31, 34, 35, 36, 18, 19

(56) References Cited

U.S. PATENT DOCUMENTS

| | | | |
|---|---|---|---|
| 3,655,395 A | 4/1972 | Karnemaat | |
| 3,939,280 A | 2/1976 | Karnemaat | |
| 3,942,970 A | 3/1976 | O'Donnell | |
| 4,081,366 A | 3/1978 | O'Donnell | |
| 4,304,588 A | 12/1981 | Moore, Jr. | |
| 4,519,831 A | 5/1985 | Moore | |
| 4,521,452 A | 6/1985 | Highsmith | |
| 4,952,229 A * | 8/1990 | Muir ............................... | 71/7 |
| 4,981,936 A | 1/1991 | Good, Jr. et al. | |
| 4,988,442 A | 1/1991 | Highsmith et al. | |
| 5,008,319 A | 4/1991 | Highsmith et al. | |

(List continued on next page.)

FOREIGN PATENT DOCUMENTS

| | | | |
|---|---|---|---|
| EP | 0 143 392 A1 | 6/1985 | |
| FR | 2 757 504 A1 | 6/1998 | |
| JP | 58-032638 | 2/1983 | |
| JP | 9-110570 A2 | 4/1997 | |
| WO | WO 99/61393 | * 12/1999 | ........... C05F/11/08 |

OTHER PUBLICATIONS

Varshovi, A. (AN 1996:199599, HCAPLUS, Diss. abstr. Int., B (1996), 56(11), 5851).*

Varshovi, A., (AN 1995:920670, HCAPLUS, Book of abstracts, 210$^{th}$ ACS National Meeting, Chicago, IL, Aug. 20–24 (1995), Issue Pt. 1, FERT–017, ACS, Washington DC).*

Advertisement in *Florida Turf Digest*, Jul./Aug. 2000, vol. 17, No. 4, Pub: Florida Turfgrass Association, Harvest Publishing Co.

Advertisement in *Florida Turf Digest*, Sep./Oct. 2000, vol. 17, No. 5, Pub: Florida Turfgrass Association, Harvest Publishing Co.

*Primary Examiner*—Sabiha Qazi
(74) *Attorney, Agent, or Firm*—Saliwanchik, Lloyd & Saliwanchik

(57) ABSTRACT

The subject invention provides methods for producing homogenous organic base fertilizer for plant nutrition and soil fertility. Also provided by the subject invention are value added fertilizer products for plant nutrition and soil fertility and concentrated liquid formulations/nutrient supplements that provide the value added nutrients to fertilizer products. Methods according to the invention involve the application of concentrated liquid(s) and/or dry formulation(s) comprising a mixture of one or more plant nutrient(s), one or more additional organic compound(s), one or more penetrate(s), and one or more optional supplement(s) into one or more organic base material(s). These organic base materials include, and are not limited to, biosolids, activated sludge, municipal compost, animal manures (e.g., horse, cow, chicken, pig, and sheep), and composted organic byproducts.

9 Claims, 4 Drawing Sheets

U.S. PATENT DOCUMENTS

| | | | |
|---|---|---|---|
| 5,019,275 A | | 5/1991 | Good, Jr. et al. |
| 5,451,523 A | * | 9/1995 | Von Fahnestock et al. . 435/290 |
| 5,549,729 A | * | 8/1996 | Yamashita ..................... 71/26 |
| 5,603,744 A | * | 2/1997 | Kurner ........................... 71/9 |
| 6,080,221 A | * | 6/2000 | Moore ........................... 71/11 |
| 6,173,527 B1 | * | 1/2001 | Pryor ......................... 47/58.1 |
| 6,228,806 B1 | | 5/2001 | Mehta |
| 6,303,367 B1 | * | 10/2001 | Kataoka et al. .......... 435/262.5 |
| 6,361,720 B1 | | 3/2002 | Highsmith |
| 6,423,667 B1 | | 7/2002 | Highsmith |
| 6,436,164 B1 | | 8/2002 | Highsmith |
| 6,497,741 B2 | * | 12/2002 | Sower ........................... 71/11 |
| 6,560,921 B1 | * | 5/2003 | Roberto ...................... 47/58.1 |
| 2002/0056948 A1 | | 5/2002 | Highsmith |
| 2002/0065198 A1 | | 5/2002 | Highsmith et al. |
| 2002/0088749 A1 | | 7/2002 | Highsmith |
| 2002/0095966 A1 | | 7/2002 | Highsmith et al. |

* cited by examiner

ORGANIC-BASED FERTILIZER

CROSS-REFERENCE TO RELATED APPLICATION(S)

This application claims priority to U.S. Provisional Application Ser. No. 60/208,422, filed Jun. 1, 2000.

BACKGROUND OF INVENTION

The continuous use of chemical pesticides and fertilizers on plants, bushes, and trees, and especially in agricultural settings in the production of crops, has created a variety of ecological problems. As the world and national populations have increased, farmers and horticulturalists have come to rely increasingly upon chemically synthesized fertilizers and chemical pesticides to maintain the same level of crop production.

More and more, organic base byproducts, including, but not limited to, biosolids, activated sludge, municipal compost, animal manures (such as cow, horse, pig, sheep, or chicken manure), and composted organic byproducts containing various plant nutrients, are being produced as a result of industrial and agricultural activities and processes. The nutrient content of these byproducts is generally low and these byproducts have been used as fillers, soil amendments, or landfill because of their low nutrient value.

Turfgrasses, whether on a fairway, putting green, or tee require rather large amounts of N fertilization during the growing season to maintain a desirable dark green color. There are numerous inorganic nitrogen fertilizer materials that can supply this needed nitrogen very adequately. However, these inorganic salts are very soluble in the soil solution and are readily converted to the nitrate form and leach, thus making frequent application of these materials necessary. Natural and synthetic slow-release organic nitrogen materials are available which release nitrogen over a longer period of time, thus reducing the frequency of application, while increasing the uniformity of turf growth and appearance throughout the season. Natural and synthetic slow-release N sources are influenced differently by the various environmental factors to which they are exposed. The subject invention provides advantageous methods that increase the nutrient value of organic base byproducts and can be enhanced in such a way as to produce a high nutrient value homogenous organic-base fertilizer. Also provided are fertilizers having high nutrient values.

BRIEF SUMMARY OF THE INVENTION

Figure 1:
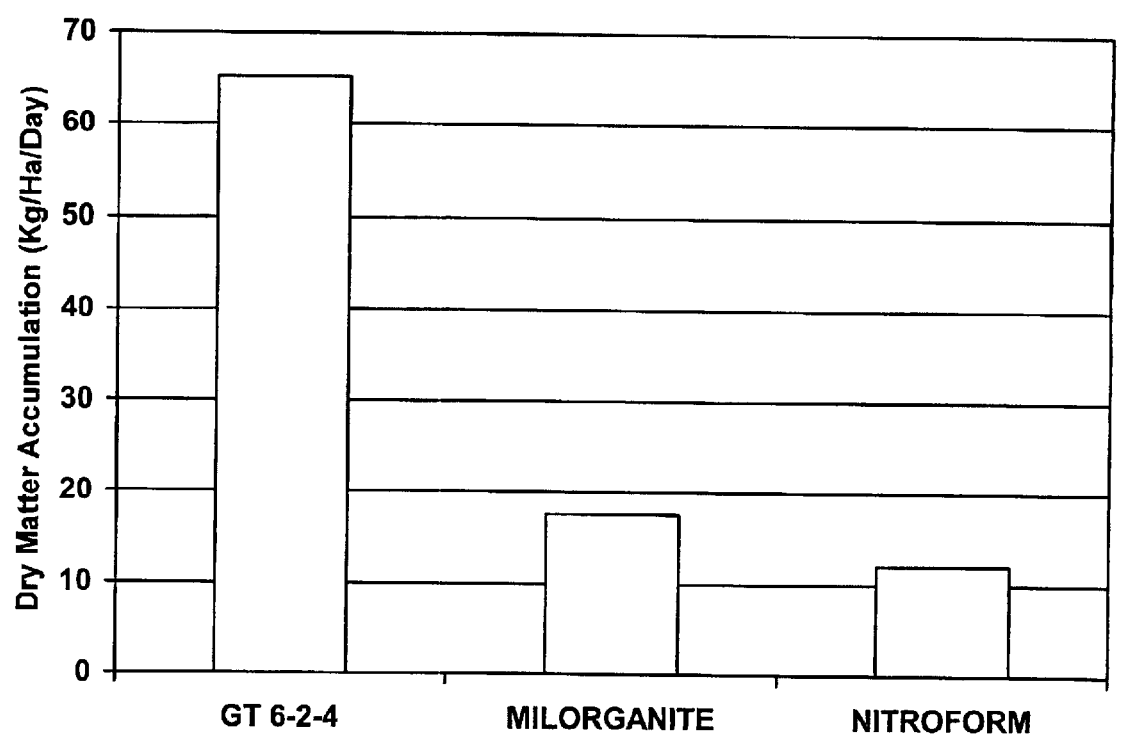
FIG. 1 depicts the effect of nitrogen source on total dry matter accumulation of turfgrass over a 56-day evaluation cycle.

The subject invention provides methods for producing homogenous organic base fertilizer for plant nutrition and soil fertility. Also provided by the subject invention are value added fertilizer products for plant nutrition and soil fertility and concentrated liquid formulations/nutrient supplements that provide the value added nutrients to the fertilizer products. Methods according to the invention involve the application of concentrated liquid(s) and/or dry formulation(s) comprising a mixture of one or more plant nutrient(s), one or more additional organic compound(s), one or more penetrant(s), and one or more optional supplement(s) into one or more organic base material(s). These organic base materials include, and are not limited to, biosolids, activated sludge, municipal compost, animal manures (e.g., horse, cow, chicken, pig, and sheep), and composted organic byproducts.

DETAILED DESCRIPTION

The subject invention provides methods for producing homogenous organic base fertilizer for plant nutrition and soil fertility. The methods of the subject invention combine organic base materials and a combination of plant nutrients, organic compounds, macronutrients, micronutrients, penetrant, beneficial microorganisms, and other soil and/or plant additives. Any combination of plant nutrients, organic compounds, macronutrients, micronutrients, penetrant, and other soil and/or plant additives may be used in practicing the methods of the subject invention.

Also provided by the subject invention are value added fertilizer products for plant nutrition and soil fertility. The value added fertilizers contain a combination of one or more of the following components: one or more organic base material(s), one or more plant nutrient(s), one or more organic compound(s), one or more macronutrient(s), one or more micronutrient(s), one or more penetrant(s), one or more beneficial microorganism(s), and one or more other soil and/or plant additive(s). Additionally, the subject invention provides concentrated liquid formulations/nutrient supplements that provide the value added nutrients and, optionally, beneficial microorganisms, to the fertilizer products. "Value added nutrients" is defined as any component added to the organic base materials supplemented in accordance with the subject invention.

The subject invention also provides concentrated liquid formulations (nutrient supplements). These liquid nutrient supplements can contain the following components: one or more plant nutrient(s), one or more organic compound(s), one or more penetrant(s), and/or one or more additional soil and plant additive(s). Plant nutrients include macronutrients such as nitrogen (N), phosphorus (P), potassium (K), secondary nutrients such as calcium (Ca), magnesium (Mg), and micronutrients such as Iron (Fe), zinc (Zn), manganese (Mn), copper (Cu), and boron (B). Any combination of plant nutrients, macronutrients, secondary nutrients, and/or micronutrients can be used in the preparation of liquid formulations according to the subject invention.

Methods according to the invention involve the application of concentrated liquid(s) and/or dry formulation(s) comprising a mixture of one or more plant nutrient(s), one or more additional organic compound(s), and one or more penetrant(s), into one or more organic base material(s). Optionally, one or more beneficial microorganism(s) may be added to the organic base material(s). According to the invention, organic base materials include, and are not limited to, biosolids, activated sludge, municipal compost, animal manures, and composted organic byproducts.

Organic compounds useful in the practice of the subject invention include, and are not limited to, biosolids, humic acid fulvic acid, and plant extracts. Plant extracts include, and are not limited to, seaweed extracts, kelp extracts, and/or the extracts of other plant materials. The subject invention allows for the incorporation of one or more organic compound(s), or combinations thereof, into the value added fertilizer products of the subject invention.

Penetrants useful in the practice of the subject invention include non-ionic wetting agents, detergent based surfactants, silicones, and/or organo-silicones. Non-limiting examples of penetrants include polymeric polyoxyalkylenes, allinol, nonoxynol, octoxynol, oxycastrol, oxysorbic (for example, polyoxyethylated sorbitol fatty-acid esters (TWEEN); thalestol, and polyethylene glycol octylphenol ether (TRITON), Sylgard 309 (straight silicone), Silwet L-77 (straight silicone), Kinetic (silicone/surfactant blend), and Herbex (silicone/surfactant blend). A penetrant can be used for the enhancement of the organic-base byproduct after granulation. In one embodiment, the penetrant is added to the liquid concentrate prior to its incorporation with the granulated organic base byproduct. Alternatively, penetrant can be added, separately, to granulated organic-base byproducts prior to the addition of the liquid concentrate. The use of a penetrant is optional if addition of liquid nutrient concentrate or dry nutrients to the organic-base byproducts occurs prior to granulation.

Organic base materials include, and are not limited to, biosolids, activated sludge, municipal compost, animal manures (e.g., horse, cow, chicken, pig, and/or sheep), and composted organic byproducts. Other organic base materials include processed animal body and vegetable products such as blood meal, feather meal, cottonseed meal, ocean kelp meal, and fish fertilizers such as fish emulsions or meal.

Microorganisms useful in the practice of the invention can be selected from one or more of bacteria, fungi, and viruses that have utility in soil enhancement. Viruses such as the NPV viruses (nuclear polyhedrosis virus) and the cabbage looper nuclear polyhedrosis virus are examples of useful viruses. Any combination of one or more microorganisms may be used in the practice of the subject invention.

Microorganisms (bacteria, fungi and viruses) that control various types of pathogens in the soil include microorganisms that control soil-born fungal pathogens, such as *Trichoderma* sp., *Bacillus subtilis*, *Penicillium* spp.; microorganisms that control insects, such as *Bacillus* sp., e.g., *Bacillus popalliae*; microorganisms that act as herbicides, e.g., *Alternaria* sp., and the like. These organisms are readily available from public depositories throughout the world.

Non-limiting examples of beneficial microorganisms that can, optionally, be added to the fertilizers of the invention to enhance the quality of soil for the growth of plants include: microorganisms of the genera *Bacillus*, for example *B. thurigensis*; *Clostridium*, such as *Clostridium pasteurianum*; *Rhodopseudomonas*, such as *Rhodopseudomonas capsula*; *Rhizobium* species that fix atmospheric nitrogen; phosphorous stabilizing *Bacillus*, such as *Bacillus megaterium*; cytokinin producing microorganisms such as *Azotobacter vinelandii*; *Pseudomonas*, such as *Pseudomonas fluorescens*; *Athrobacter*, such as *Anthrobacter globii*; *Flavobacterium* such as *Flavobacteriium* spp.; and *Saccharomyces*, such as *Saccharomyces cerevisiae*, and the like. The number of microorganisms that can be used in the practice of the subject invention can range from about $10^5$ to $10^{10}$ organisms per gram of fertilizer.

Optional soil and/or plant additives that can be added to the fertilizer compositions of the invention include water trapping agents, such as zeolites; natural enzymes; growth hormones (such as the gibberellins, including gibberellic acid and gibberellin plant growth hormones); and control agents, including pesticides such as acaracides, molluskicides, insecticides, fungicides, nematocides, and the like.

In one embodiment, liquid nutrients are incorporated into organic base materials by spray application on palletized or granulated organic base materials. Alternatively, the liquid nutrients can be added via direct mixture into the organic base prior to granulation. In either embodiment, value added products for plant nutrition and soil fertility are produced.

In various embodiments, beneficial microorganisms can, optionally, be added to the organic base materials before, during, or after granulation or polarization of the organic base material. In one embodiment, beneficial microbes are added after the granulation or pelletization process.

Concentrated liquid formulation(s) may be applied to an organic base by spraying onto organic base materials as they enter, once they are already in, or as they exit a mixing means. Mixing means include, and are not limited to, rotating mixers, other rotating containers, or granulation drums. The mixing means may rapidly rotate to mix and incorporate the liquid concentrate into the organic base materials. Concentrated liquid formulations or concentrated nutrient supplements are terms that may be used interchangeably throughout the specification.

Dry nutrient formulations may be applied to wet organic base materials prior to the drying and granulation process. The dry formulation(s) react with the wet organic base materials and are mixed through the process of granulation. Dry soluble macronutrient sources useful in the practice of the subject invention include: nitrogen sources, such as ammonium sulfate; and potassium sources, such as potassium nitrate, potassium phosphate, and potassium sulfate.

In one embodiment, liquid nutrients are incorporated into organic base materials by spray application on pelletized or granulated organic base materials. Alternatively, the liquid nutrients can be added via direct mixture into the organic base prior to granulation. In either embodiment, value added products for plant nutrition and soil fertility are produced.

The concentrated liquid formulation(s) and the dry formulation(s) may vary in regards to type and concentrations of plant nutrients depending on the desired end formulation for the homogenous organic-base granular fertilizer. These formulations may be varied to provide the desired nutritional components for a particular crop, plant, or grass.

Concentrated liquid formulation(s) may be applied to an organic base by spraying onto organic base materials as they enter, once they are already in, or as they exit a mixing means. Mixing means include, and are not limited to, rotating mixers, other rotating containers, or granulation drums. The mixing means may rapidly rotate to mix and incorporate the liquid concentrate into the organic base materials.

Dry nutrient formulations may be applied to wet organic base materials prior to, during, or after the drying and granulation process. The dry formulation(s) react with the wet organic base materials and are mixed through the process of granulation.

The subject invention has been used to enhance biosolids produced by municipalities. The biosolids were enhanced after granulation to produce a higher nutrient value fertilizer and then applied to turfgrass as part of an efficacy study performed at the University of Florida.

Enhancement Using Liquid Concentrate:

A liquid nutrient concentrate is prepared incorporating one or any combination of the following, depending on the desired end formulation: nitrogen, phosphorus, potassium, magnesium, calcium, iron, zinc, manganese, plant extract, humic and fulvic acids, beneficial microorganisms and penetrant.

A penetrant can be used for the enhancement of the organic-base byproduct after granulation. In one embodiment, the penetrant is added to the liquid concentrate prior to its incorporation with the granulated organic base byproduct. Alternatively, the penetrant can be added, separately, to granulated organic-base byproducts prior to the addition of the liquid concentrate. The use of a penetrant is optional if addition of liquid nutrient concentrate or dry nutrients to the organic-base byproducts occurs prior to granulation. Penetrant is typically used to break the hydrophobic of the granulated organic-base byproduct and to increase absorption of the liquid concentrate.

Liquid nutrient concentrate can be added by spraying, injecting or otherwise incorporating it into the organic-base byproduct after granulation or while the organic-base byproduct is being rotated or mixed in a rotating blender/mixer or other apparatus. The liquid concentrate should be added uniformly so as to allow for uniform absorption by the organic-base byproduct granules. In some embodiments, the addition of the liquid concentrate should be performed incrementally to allow time for absorption by the organic-base byproduct granules. The amount added incrementally depends on the amount of organic-base byproducts being enhanced and the end formulation. Fifteen to thirty minute intervals can be provided between each incremental addition depending on the total amount to be added, the moisture content of the organic-base byproducts at the different stages of enhancement, and the ambient temperature.

When utilizing the method of this invention for preparation of slow release homogenous organic-base fertilizer, the liquid concentrate added to the organic-base byproduct should be between 1% to 50%, preferably 1.5% to 40%, more preferably 2% to 30%, and most preferably between 2.5% to 25% of the total weight of the finished product depending on the desired formulation. When the liquid concentrate is added after granulization of the organic-base byproduct, the following macronutrient sources are preferred for enhancing the nutrient value of the organic-base byproduct: nitrogen (N) sources, including urea, ammonium nitrate, ammonium sulfate, methylane urea, and/or urea formaldehyde; potassium (K) sources, including potassium nitrate, potassium thiosulfate, potassium phosphate, potassium hydroxide, potassium sulfate, and/or potassium carbonate; and phosphorus (P) sources, including ammonium phosphate, potassium phosphate, and/or phosphoric acid. Any combination of these macronutrients may be used in the practice of the invention and one or more of the N, P, or K sources may be used in formulating compositions according to the subject invention.

In various embodiments, the fertilizers of the subject invention contain (by weight) up to 30% nitrogen; up to 10% phosphorus; up to 30% potassium; up to 10% calcium; up to 5% magnesium; up to 5% iron; up to 0.05% zinc; up to 0.5% manganese; up to 0.05% copper; and up to 0.01% boron. Any combination of these components can be used in formulating fertilizers according to the subject invention. Further, the various percentages cited infra are to be understood as providing literal and written support for any percentage (or fractional value thereof) recited within each individual range of percentages. Some fertilizer compositions, according to the invention, comprise N-P-K values of about: 6-1-0, 7-1-0, 8-1-0, 9-1-0, 10-1-0, 12-1-0, 4-2-4, and 6-2-4. N-P-K values are understood to represent the percentages of these components by weight.

High quality homogenous slow-release organic-base fertilizer can be prepared prior to drying and granulation of the organic-base byproduct(s) by incorporating selected dry soluble plant nutrients and additional organic substrates into organic-base byproducts containing 70% to 90% moisture. If this method is used, the selection of added materials must be based on their solubility and their stability at temperatures of about 85° to 100° C. The solubility of selected plant nutrients should be high in organic-base byproducts containing 70% to 90% moisture. The dry soluble plant nutrients and organic substrates are incorporated into the organic-base byproducts in a mixing/homogenizer chamber or auger prior to the dryer/granulator.

The following dry soluble macronutrient sources are preferred for enhancing the nutrient value of the organic-base byproduct: nitrogen sources include ammonium sulfate; potassium sources include potassium nitrate, potassium phosphate, and potassium sulfate.

The fertilizer compositions of the invention can be in solid form or in the form in aqueous solution. Solid forms include powders and larger particulate forms, e.g., from 20 to 200 mesh. Solid form fertilizer particles can be encapsulated in water soluble coatings (e.g., dyed or undyed gelatin spheres or capsules) extended release coatings, or by microencapsulation to a free flowing powder using one or more of gelatin, polyvinyl alcohol, ethylcellulose, cellulose acetate phthalate, or styrene maleic anhydride. Separately encapsulated microorganisms can then be mixed with the powder or larger particulates and any optional components. Encapsulated microorganisms can include nutrients as well as the microorganisms.

EXAMPLE 1

Materials and Methods

Fertilizers produced according to the subject invention were evaluated to compare the quality, growth and N uptake response of three slow-release N sources. On a comparative basis, the Green Technologies, Inc. granular slow-release fertilizer (GT-6-2-4) produced higher visual quality, growth rate, and total N uptake during two 56-day evaluation cycles than did MILORGANITE or NITROFORM.

GT-6-2-4 released its N over an extended period and induced acceptable growth and quality responses in turfgrass. Acceptable levels of quality and growth can be attained when the material is applied at 1.5 lbs N/1000 sq ft of 56-day cycles, but it was noted that the second 56-day cycle produced higher visual quality turf than did the first evaluation cycle. Even though the visual quality ratings for the second 56-day evaluation period were higher, the dry matter production of the turfgrass in response to the GT-6-2-4 was equivalent to the first evaluation cycle. This indicates that the turfgrass was not accumulating excessive N and was enhanced in quality. GT-6-2-4 is a superior slow-release N source for turfgrass and is capable of inducing responses superior to the commercially available slow-release N products, MILORGANITE and NITROFORM.

Treatments were established on a six-month old stand of Tifsport turfgrass on 6 by 9 foot plots arranged in a randomized complete block with three replications. Three slow-release N sources (GT-6-2-4, MILORGANITE, and NITROFORM) were applied on 56-day cycles at rates equivalent to 1.5 lbs N/1000 sq ft. Evaluation of the material ran for two 56-day cycles. Visual quality ratings on a scale of 1 to 9 were taken at 7, 14, 21, 28, 42, and 56 days after application. A rating of 1 represents brown or dead turfgrass, 9 represents superior quality turfgrass, and 5.5 represents the minimum acceptable quality. Clippings for growth rate and N analysis were taken at 28, 42, and 56 days after application for both 56-day application cycles. Total N content was determined by wet digestion and the use of a rapid flow N analyzer by the Kjaldahl method of analysis. Data were analyzed using the Statistical Analysis System (SAS). Mean separation was accomplished by the use of Duncan's Multiple Range procedure at the 0.05% probability level.

EXAMPLE 2

Visual Quality Ratings

First Evaluation Cycle: Differences in visual quality relative to treatment were observable within 7 days after application, and the visual differences in the materials were retained throughout the evaluation period. By 14 days after application, statistical differences relative to the N source applied were noted. The GT-6-2-4 material produced a higher visual quality than did the NITROFORM at 14 days after application. A similar trend relative to the influence of N sources on visual quality was noted at 21 days after application. Visual quality of the turfgrass receiving MILORGANITE had improved by 28 days after application and was statistically equivalent to the experimental material. By 28 days after application, the turfgrass receiving the GT-6-2-4 had attained a quality rating of 5.7 (which is above the minimum acceptable level of 5.5). GT-6-2-4 produced the highest overall mean visual quality rating (MVQR) of the three slow-release N sources during the first 56-day evaluation cycle, with a mean rating of 6.0. The other two N sources, MILORGANITE (MVQR=5.4) and NITROFORM (MVQR=5.0), failed to produce a mean visual quality rating within the minimum acceptable level of 5.5.

Second Evaluation Cycle: Overall visual quality ratings for the second 56-day cycle were higher than for the first 56-day cycle. Once again, GT-6-2-4 produced a higher visual quality rating than MILORGANITE and NITROFORM at 7 days after application. A mean rating of 8.8 was attained by the GT-6-2-4 at 7 days after application, indicating a very high quality response on a scale of 1 to 9. MILORGANITE and NITROFORM also produced high quality responses, but the visual quality was statistically inferior to the GT-6-2-4 response. Overall, GT-6-2-4 produced the highest mean visual quality rating of 8.2, which was statistically different from MILORGANITE (MVQR=7.7) and NITROFORM (MVQR=7.6). These data suggest that the new slow-release N source is capable of producing turfgrass of superior quality over an extended period of time and that it is capable of producing responses that are superior to MILORGANITE and NITROFORM on a comparative basis.

EXAMPLE 3

Dry Matter Production and N Uptake

Figure 2:
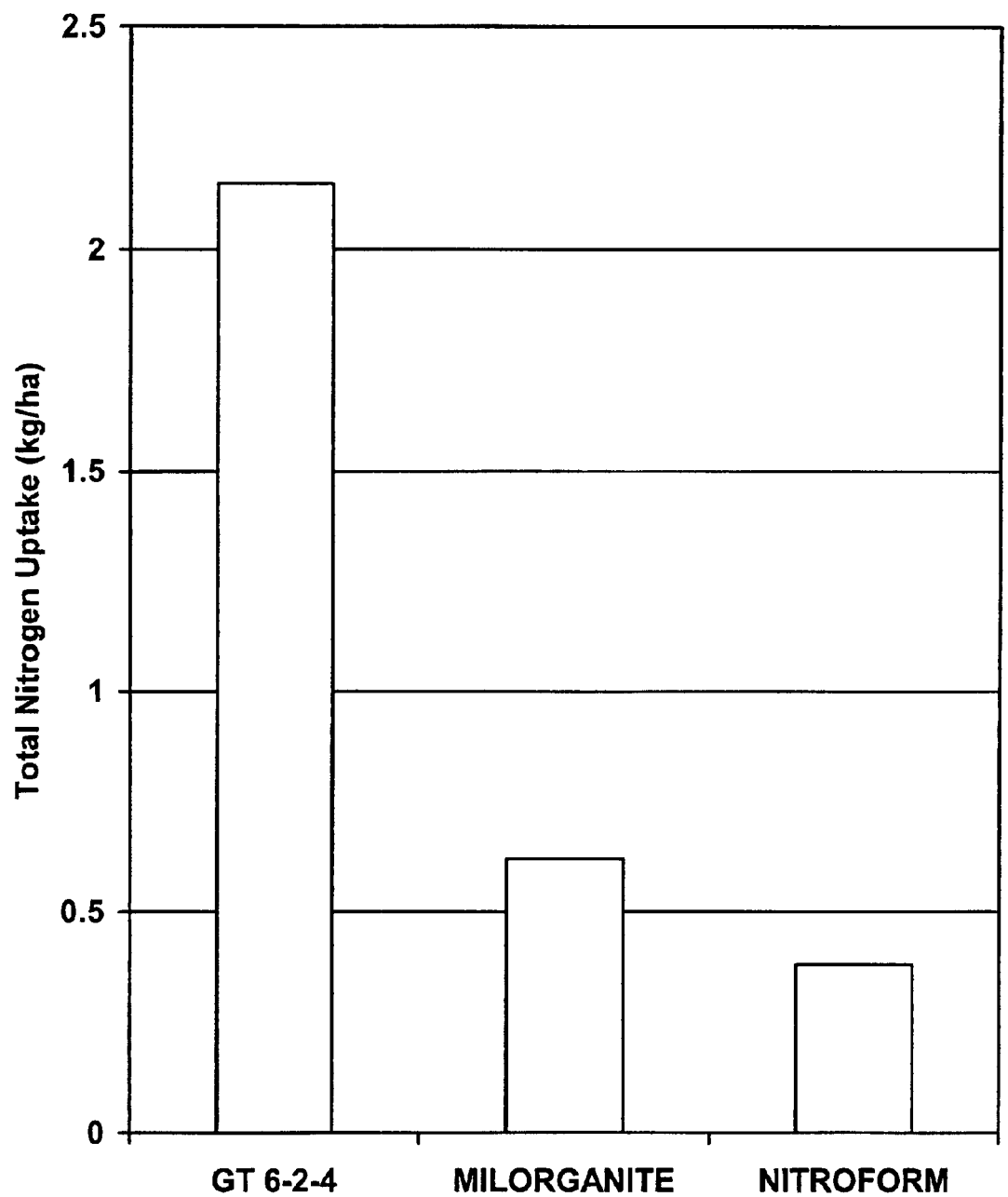
FIG. 2 illustrates the effect of nitrogen source on total nitrogen uptake by turfgrass over a 56-day evaluation cycle.

First Evaluation Cycle: Clippings were taken at 28, 42, and 56 days after application of the N sources. Clippings were dried and weighed for dry matter production estimates. Similar trends across all three collections were observed. Total dry matter production of the three collections are presented in FIG. 1. Large differences in dry matter production were noted among the N sources applied. GT-6-2-4 produced almost 4-fold more dry matter than did the other two slow-release N sources. This material appears to be unique in its properties in that it is capable of inducing a quality turfgrass over an extended period of time with good growth characteristics. Even though a superior growth rate was attained, the turfgrass did not accumulate an excessive amount of N in its tissue, as evidenced by the data presented in FIG. 2. A turfgrass containing 3.09% N in the tissue is not considered to have excessive N content. Total N uptake followed the same trend as total dry matter production (FIG. 2).

Figure 3:
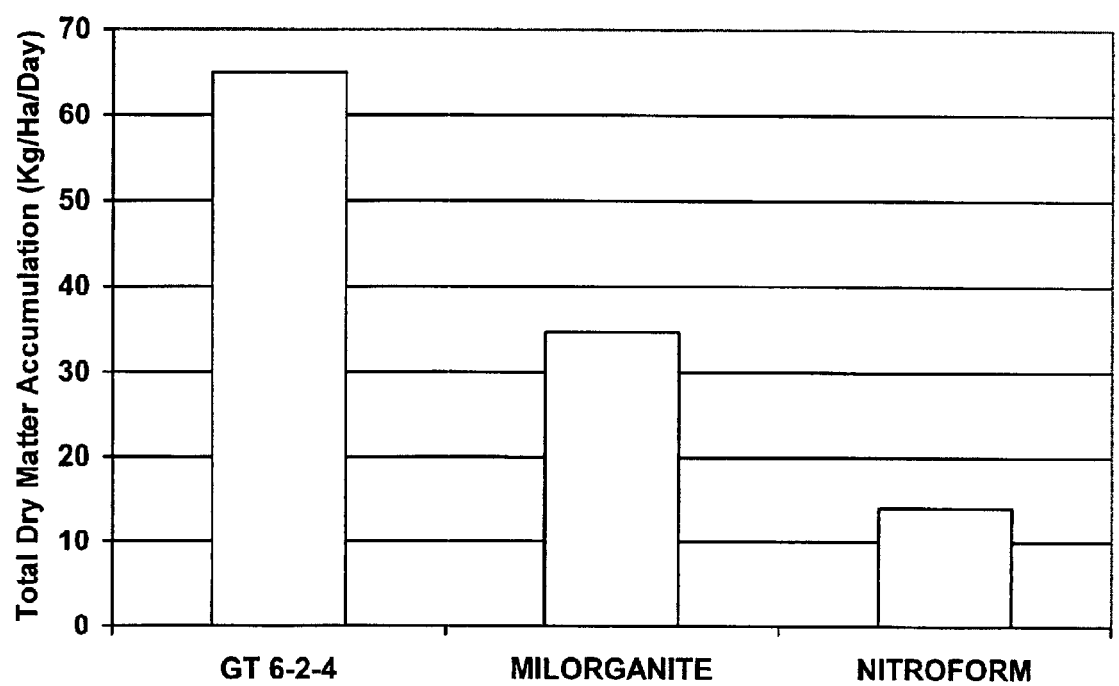
FIG. 3 shows the effect of nitrogen source on total dry matter accumulation of turfgrass over a second 56-day evaluation cycle.
Figure 4:
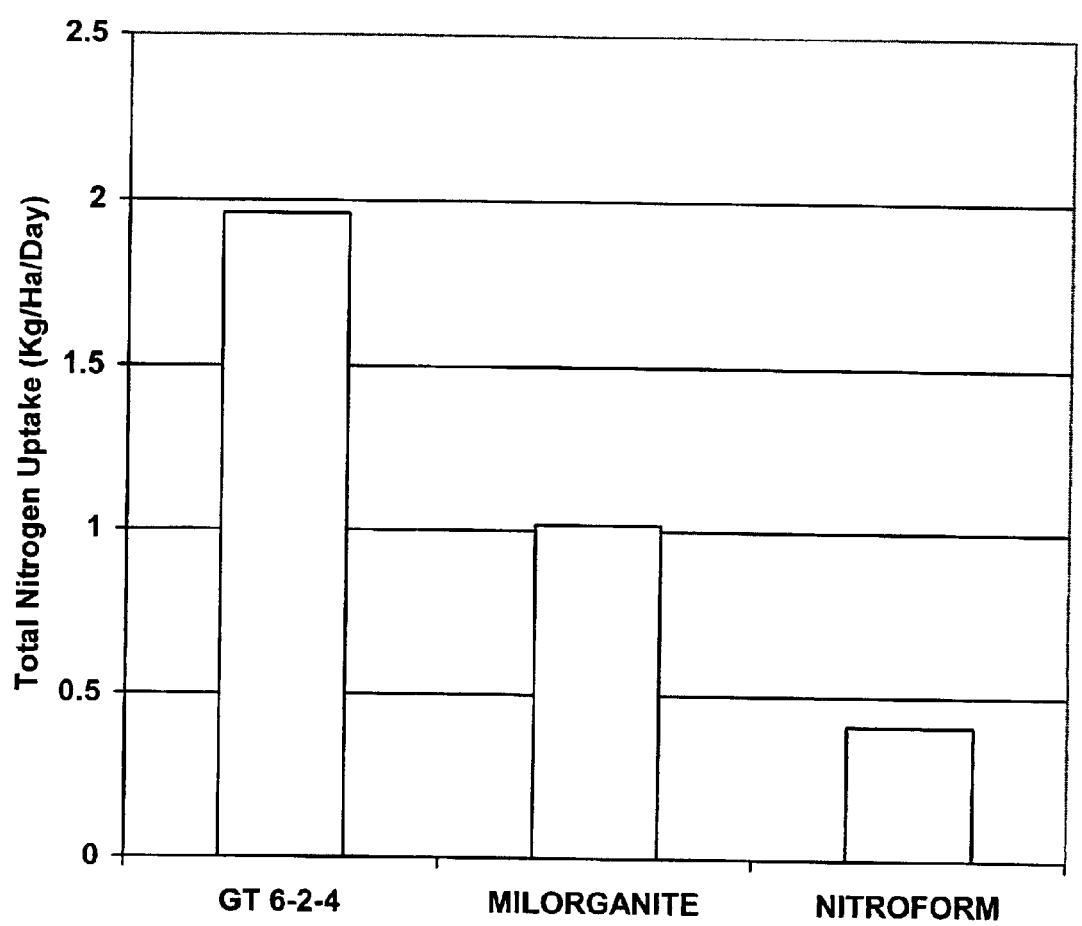
FIG. 4 demonstrates the effect of nitrogen source on total nitrogen uptake by turfgrass over a second 56-day evaluation cycle.

Second Evaluation Cycle: Almost identical total dry matter mass was produced by the GT-6-2-4 during the second 56-day evaluation cycle (FIG. 3). MILORGANITE essentially doubled its dry matter production. NITROFORM maintained almost the same growth rate as it did during the first evaluation cycle. The same statistical mean separation was observed in that GT-6-2-4 produced the superior quantity of dry matter. Total N uptake followed the dry matter production trend once again with the mean levels of total N uptake falling in the same statistical classes as the dry matter production (FIG. 4).

What is claimed is:

1. A method of preparing high quality homogenous slow-release organic-base fertilizer comprising:
   a. preparing a liquid concentrate comprising nitrogen, potassium, phosphorus, ammonium nitrate, bacteria, humic acid, one or more wetting agent and natural enzymes;
   b. adding said liquid concentrate to a biosolid;
   c. mixing the liquid concentrate-biosolid composition in a mixing means; and
   d. drying said composition.

2. The method according to claim 1, wherein said composition is dried at a termperature of 85° to 100° C.

3. The method according to claim 1, wherein said mixing means is a rotating mixer or blender.

4. The method according to claim 1, wherein said mixing means is a granulation drum.

5. The method according to claim 2, wherein said mixing means is a rotating mixer or blender.

6. The method according to claim 2, wherein said mixing means is a granulation drum.

7. The method according to claim 1, comprising adding a liquid concentrate that contains nitrogen (N), phosphorus (P), and potassium (K) in amounts that provide N-P-K percentages (by weight) of about 6-1-0, 7-1-0, 8-1-0, 9-1-0, 10-1-0, 12-1-0, 4-2-4, or 6-2-4 for a finished product.

8. The method according to claim 2, comprising adding a liquid concentrate that contains nitrogen (N), phosphorous (P), and potassium (K) in amounts that provide N-P-K percentages (by weight) of about 6-1-0, 7-1-0, 8-1-0, 9-1-0, 10-1-0, 12-1-0, 4-2-4, or 6-2-4 for a finished product.

9. The method of claim 1, further comprising the addition of water soluble and/or extended release coatings.

* * * * *